3,020,257
METHOD FOR MANUFACTURE OF POLYISOBUTYLENE-VINYL ACETATE GRAFT COPOLYMER

Mitsuo Iwakiri and Tsunetoshi Hino, Osaka, Japan, assignors to Haris Co., Ltd., Osaka, Japan, a corporation of Japan
No Drawing. Filed Feb. 12, 1958, Ser. No. 714,679
2 Claims. (Cl. 260—45.5)

This invention relates to a manufacturing method of a super-low polymerization degree graft co-polymer made from polyisobutylene and vinyl acetate. The particulars are as follows.

One of ketones, for instance, acetone, methyl ethyl ketone, methyl propyl ketone, methyl isopropyl ketone, methyl butyl ketone or other similar lower ketones is added as telogen in a vinyl acetate monomer, and by adding therein proper quantity of one of peroxides, for instance, benzoyl peroxide, acetyl peroxide, lauroyl peroxide or others, as the polymer degree requires, the said monomer is polymerized. But in the case proper quantity of polyisobutylene is added in advance to the said ketone and further any one of the said catalysts is added according to necessity. By agitating and heating the selected ketone, peroxide and vinyl acetate monomer and the polyisobutylene in a reaction vessel with a back-flow cooler set on under the said process the said monomer is graft co-polymerized. After stoppage of the said back-flow, both heating and agitating the selected ketone, peroxide and vinyl acetate monomer and the polyisobutylene are continued for about two hours in order to complete the said reaction. After the distilled part of unreacted monomer and telogen is removed under normal or reduced pressure, the same which is still residual slightly in spite of the said process, is excluded by blowing vapour into the said graft co-polymer, and moreover, the volatile matter in the said manufactured graft co-polymer is excluded sufficiently by both heating and agitating under normal or reduced pressure. By the method mentioned above, a white, tasteless and odourless super-low polymerization degree graft co-polymer is made.

An important object of this invention is to apply the product under this invention mainly to one of bases of chewing gum. The known chewing gum is made in such a way as seasoned with sugar, perfume etc. as its principal base, natural gum-like substance, for instance, chicle, jelutong (pontianak) and like gums. However, in Japan and other countries where resources of natural gum are short, vinyl acetate resins, instead of natural gum-like substances, are applied as bases of a chewing gum at present.

Another important object of this invention is to provide a base of chewing gum which has not only superior quality that is characteristic to natural gum-like base of a chewing gum, but also a function of getting rid of defects of natural gum-like base of a chewing gum by properties of synthetic resins. In general, though a chewing gum with natural gum-like substance as its base has merits that the touch-sense thereof is very favourable and sugar-like sweetness remains therein, the same has several defects that, for example, disused chewing gum is too adhesive to clean them easily because the degree of adhesiveness of natural gum-like substance is too high to be proper as base of a chewing gum itself.

So, several studies are attempted in order to eliminate such defects of natural gum-like substance as mentioned above. But no study has practically obtained sufficient effect. On the contrary, it has come to the front in Japan and other countries, where resources of natural gum are short, that the subject mentioned above is accomplished with a chewing gum of synthetic resins. In case of applying the product under this invention to one of bases of chewing gum, the said chewing gum has a quality that is closely allied to superiority of a natural-gum chewing gum mentioned, a merit as well that unnecessary high adhesiveness is not given due to a property of synthetic resins and a quantity of consumption of plasticizer or softner is on the decrease compared with the same in case of applying natural gum to base of a chewing gum.

Other objects and advantages of the invention are to make the product under this invention applicable to other goods as well as chewing gum mentioned above which can be applied characteristic to its nature.

Accordingly, the ultimate object and effect of this invention are as follows.

It is possible by the said method under this invention to produce a white, tasteless and odourless super-low polymerization degree graft co-polymer with high yield ratio which has superior properties as a polymer plasticizer.

Examples of embodiments of the said manufacturing method are described below.

Example 1

50 parts of polyisobutylene are added to 250 parts of methyl ethyl ketone, and 250 parts of vinyl acetate monomer and 1.25 parts of benzoyl peroxide as catalyst are added to the mixture mentioned, and further, the said mixture mentioned above is heated under agitation in a reaction-vessel with a back-flow cooler set on. Polymerization in a reaction-fluid starts along with rising of temperature which comes from 75° C. to 80.5° C. at the highest. After stoppage of back-flow, both heating and agitating are continued for two hours in order to complete the reaction. After the said reaction is ended, the distilled part of methyl ethyl ketone and unreacted monomer is removed, and moreover, the volatile matter comprised in the produced polymer is excluded by blowing vapour into it, and further, the remained polymer is heated under water bath in order that moisture therein be excluded. As the result of the said process 266 parts of graft copolymer are produced. A yield-ratio of the said polymer is 88.6% and a polymerization degree thereof is 100 or so.

Example 2

This example closely resembles the said Example 1. But in this example, 25 parts of polyisobutylene is applied under the same method as under Example 1 mentioned above, and 251 parts of graft co-polymer is produced. A yield-ratio of the said polymer is 91.3% and a polymerization degree thereof is 100 or so.

Having thus described certain embodiments of the invention, what is claimed is:

1. The steps in the process for the production of a substitute for chicle in chewing gum, which consist in (1) concurrently commencing the reaction of a mixture of 50 parts of polyisobutylene and 250 parts of vinyl acetate in the presence of 250 parts of a lower ketone of the group consisting of acetone, methyl ethyl ketone, methyl propyl ketone, methyl isopropyl ketone and methyl butyl ketone, and 1.25 parts of a catalyst of the group consisting of benzoyl peroxide, acetyl peroxide and lauroyl peroxide, in a reaction zone at a temperature between 75° C. and 80.5° C., and continuously circulating the mixture from said reaction zone through a cooling zone and returning the mixture to said reaction zone; (2) completing graft co-polymerization, after polymerization commences in said reaction zone, by discontinuing circulation through said cooling zone and maintaining said mixture in said reaction zone for two hours; and (3) blowing vapour into the product of step (2) until unreacted monomer and lower ketone are driven therefrom and a white, tasteless and odorless plastic substitute for chicle results.

2. The steps in the process for the production of a substitute for chicle in chewing gum, which consist in (1) concurrently commencing the reaction of a mixture of 50 parts of polyisobutylene and 250 parts of vinyl acetate in the presence of 250 parts of a lower ketone of the group consisting of acetone, methyl ethyl ketone, methyl propyl ketone, methyl isopropyl ketone and methyl butyl ketone, and 1.25 parts of a catalyst of the group consisting of benzoyl peroxide, acetyl peroxide and lauroyl peroxide in a reaction zone at a temperature of 80.5° C., and continuously circulating the mixture from said reaction zone through a cooling zone and returning the mixture to said reaction zone; (2) completing graft copolymerization, after polymerization commences in said reaction zone, by discontinuing circulation through said cooling zone and maintaining said mixture in said reaction zone for two hours; and (3) blowing vapour into the product of step (2) until unreacted monomer and lower ketone are driven therefrom and a white, tasteless and odorless plastic substitute for chicle results.

References Cited in the file of this patent

UNITED STATES PATENTS

| | | |
|---|---|---|
| 2,840,447 | Green | June 24, 1958 |
| 2,852,565 | Nozaki | Sept. 16, 1958 |

FOREIGN PATENTS

| | | |
|---|---|---|
| 679,562 | Great Britain | Sept. 17, 1952 |